United States Patent
Yamashita

(10) Patent No.: US 8,973,506 B2
(45) Date of Patent: Mar. 10, 2015

(54) TRANSPORTING SYSTEM

(75) Inventor: Shin Yamashita, Obertshausen (DE)

(73) Assignee: Dematic Systems GmbH, Heusenstamm (DE)

( * ) Notice: Subject to any disclaimer, the term of this patent is extended or adjusted under 35 U.S.C. 154(b) by 0 days.

(21) Appl. No.: 13/980,151

(22) PCT Filed: Jan. 20, 2012

(86) PCT No.: PCT/EP2012/050826
§ 371 (c)(1),
(2), (4) Date: Jul. 17, 2013

(87) PCT Pub. No.: WO2012/104154
PCT Pub. Date: Aug. 9, 2012

(65) Prior Publication Data
US 2013/0305955 A1 Nov. 21, 2013

(30) Foreign Application Priority Data

Feb. 1, 2011 (DE) .......................... 10 2011 000 447

(51) Int. Cl.
*B61K 7/00* (2006.01)
*B61K 7/16* (2006.01)
*B65G 1/06* (2006.01)

(52) U.S. Cl.
CPC .. *B61K 7/16* (2013.01); *B65G 1/065* (2013.01)
USPC ............................ 104/249; 104/254; 104/250

(58) Field of Classification Search
USPC .................................................. 104/249–259
See application file for complete search history.

(56) References Cited

U.S. PATENT DOCUMENTS 3,754,512 A * 8/1973 Kmety .......................... 104/249
4,494,905 A * 1/1985 Yamaji et al. ................. 414/584
(Continued)

FOREIGN PATENT DOCUMENTS

DE 2242922 3/1973
DE 3129368 A1 2/1983
(Continued)

OTHER PUBLICATIONS

International Search Report and Written Opinion of the International Searching Authority from corresponding Patent Cooperation Treaty (PCT) Application No. PCT/EP2012/050826, mailed Apr. 12, 2012.
(Continued)

*Primary Examiner* — Jason C Smith
(74) *Attorney, Agent, or Firm* — Gardner, Linn, Burkhart & Flory, LLP

(57) ABSTRACT

The invention relates to an in-house track-bound transporting system with self-propelling carriages that move on rails. The system has stoppers to prevent said carriages from crossing over open rail ends or track borders, and the system is provided with stops. The stoppers collide with the stops in order to prevent a crossing-over, said stops having first and second fixed stop elements. The stoppers can be moved between a first crossing-over position and a second crossing-over position such that the first stop elements can be crossed over in the first crossing-over position of the stoppers, and the second stop elements can be crossed over in the second crossing-over position of the stoppers, wherein the first stop elements cannot be crossed over in the second crossing-over position of the stoppers, and the second stop elements cannot be crossed over in the first crossing-over position of the stoppers.

21 Claims, 3 Drawing Sheets

(56) References Cited

U.S. PATENT DOCUMENTS

| | | | |
|---|---|---|---|
| 4,739,863 A * | 4/1988 | Stauffer | 188/32 |
| 4,790,247 A * | 12/1988 | Summa | 104/172.2 |
| 5,029,675 A * | 7/1991 | Zhukov et al. | 188/62 |
| 5,738,017 A * | 4/1998 | Behringer | 104/250 |
| 5,947,030 A * | 9/1999 | Spieldiener et al. | 104/250 |
| 6,305,295 B1 * | 10/2001 | Buck | 104/249 |
| 6,484,643 B1 * | 11/2002 | Hilgert | 104/254 |
| 8,485,105 B2 * | 7/2013 | Heyden et al. | 104/249 |
| 8,485,106 B2 * | 7/2013 | Thyssen, Jr. | 104/249 |
| 8,567,571 B1 * | 10/2013 | Neff et al. | 188/36 |
| 2009/0031914 A1 * | 2/2009 | Hahn et al. | 104/249 |
| 2010/0083865 A1 * | 4/2010 | Heyden et al. | 104/249 |
| 2010/0147179 A1 * | 6/2010 | Jager | 104/96 |
| 2011/0232521 A1 * | 9/2011 | Heyden et al. | 104/249 |
| 2012/0012027 A1 * | 1/2012 | Thyssen, Jr. | 104/259 |
| 2012/0055368 A1 * | 3/2012 | Heyden et al. | 104/257 |
| 2013/0305955 A1 * | 11/2013 | Yamashita | 104/249 |

FOREIGN PATENT DOCUMENTS

| | | |
|---|---|---|
| DE | 3512016 A1 | 10/1986 |
| DE | 3734068 A1 | 4/1988 |
| DE | 19500503 A1 | 10/1995 |
| DE | 19742102 C1 | 7/1999 |
| DE | 19822109 A1 | 11/1999 |
| DE | 202009012490 U1 | 1/2010 |
| EP | 1254852 B1 | 7/2008 |
| WO | 2012138538 A2 | 10/2012 |

OTHER PUBLICATIONS

International Preliminary Report on Patentability from corresponding Patent Cooperation Treaty Patent Application No. PCT/US2012/050826 issued Aug. 6, 2013.

* cited by examiner

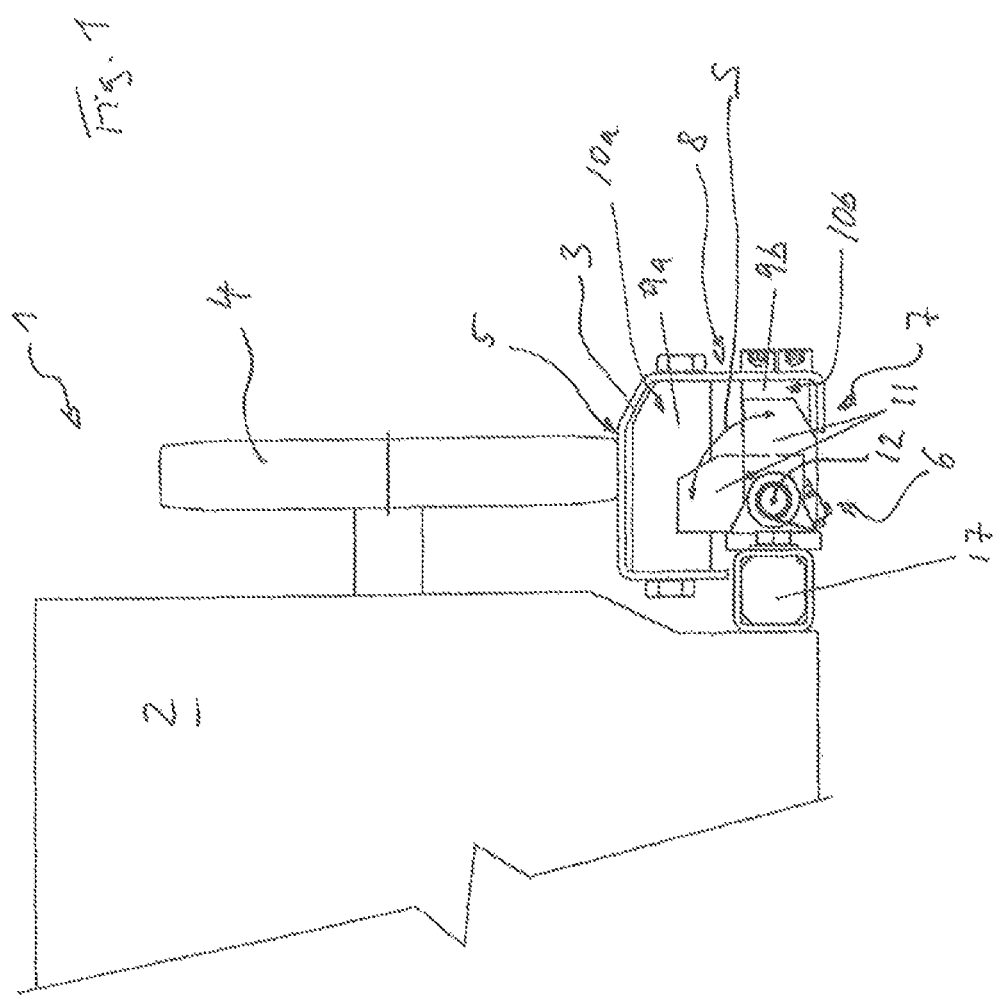

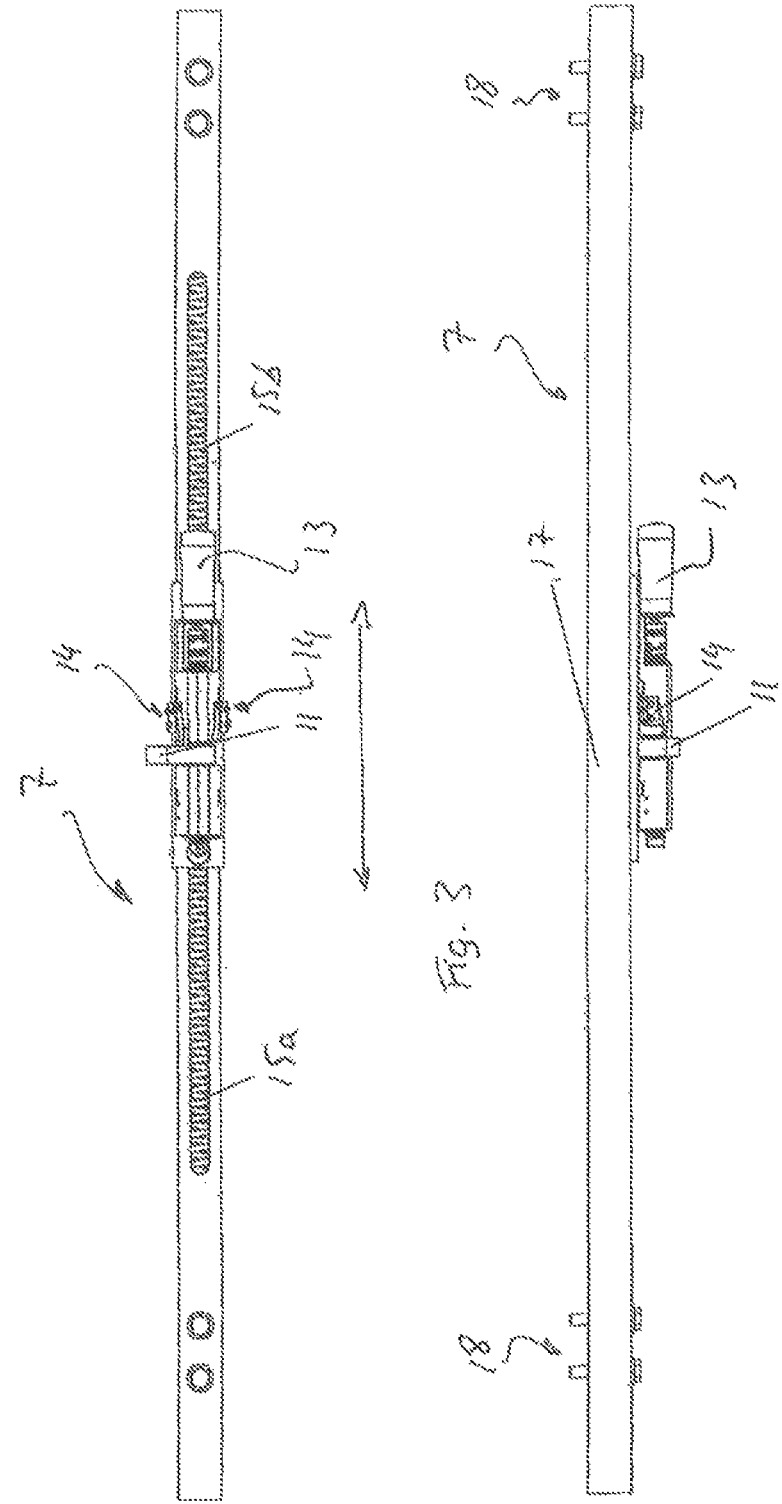

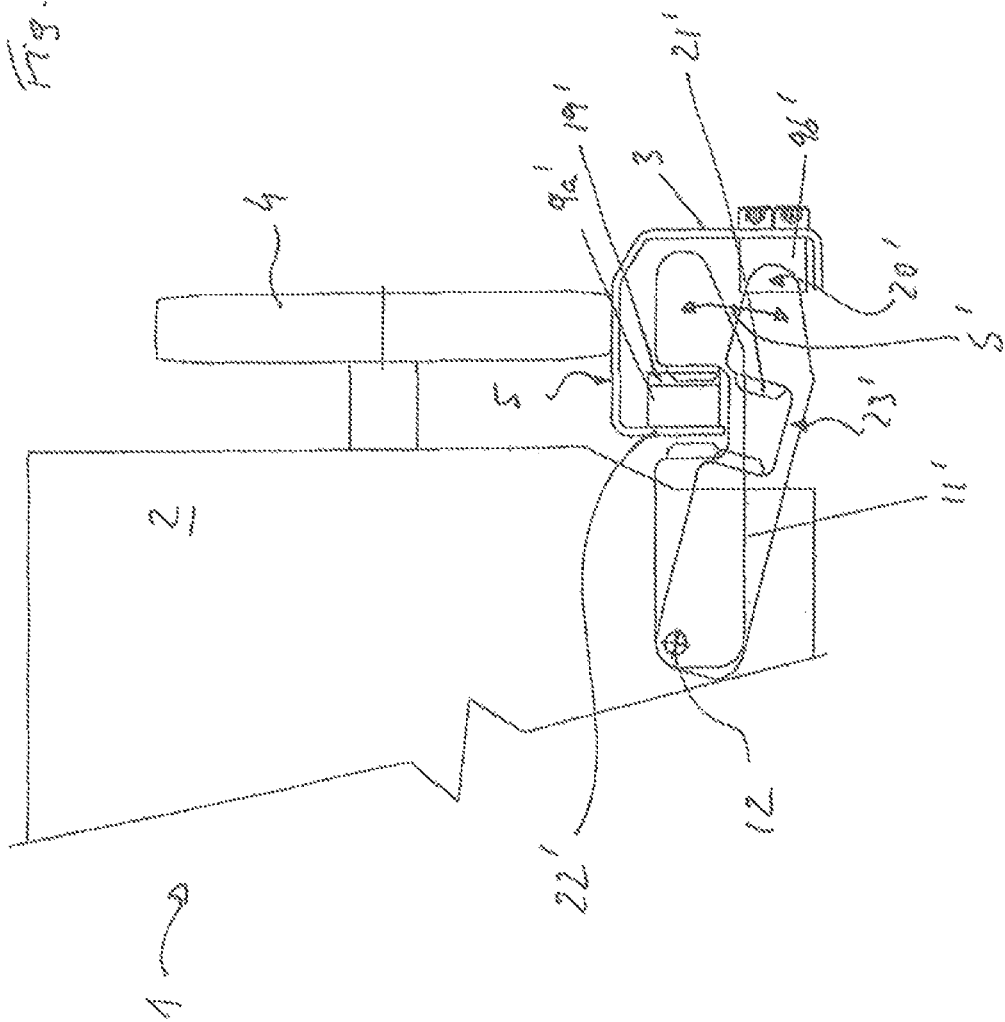

TRANSPORTING SYSTEM

CROSS REFERENCE TO RELATED APPLICATION

The present application claims the priority benefits of International Patent Application No. PCT/EP2012/050826, filed on Jan. 20, 2012, which is hereby incorporated herein by reference in its entirety.

BACKGROUND OF THE INVENTION

The invention relates to an in-plant rail-bound transport system with shuttles that travel on rails, wherein the system has stop bars to secure against overrunning of open rail ends or boundaries of travel paths, and is provided with stops, wherein stop bars engage the stops to prevent such overrunning.

Transport systems of this type are used both in the warehousing area and also in the production area and comprise shuttles. These are usually single-level rack serving machines, or so-called satellite vehicles or autonomous vehicles, which transport goods, with or without containers, and place them into, and remove them from, storage in the warehousing and production areas.

At the ends of the rail lines, buffers or stops which restrain the vehicles are provided for safety reasons. This is important, for example, in the event of malfunctions, in order to prevent a crash involving the vehicles or even undesired entry of the vehicles into specific rail areas.

DE 37 34 068 C2, for example, discloses an in-plant rail-bound transport system having vehicles which travel in a rail system with stationary rails and moveable rails, shunting wagons, lifts, turntables, etc. To prevent overrunning of open rail ends, the vehicles have at least one shock absorber and both the stationary and also the moveable rails each have at least one stop element which can move between an operational position, in which they stop the vehicle by abutment of the shock absorber, and an inoperative position in which they permit passage of the vehicle. The transfer of the stop elements from the operational position to the inoperative position is effected by an actuation device only if a moveable rail is positioned in such a way with respect to the stationary rail that a vehicle can run over the impact point.

SUMMARY OF THE INVENTION

The type of buffer or stop of the prior art does not offer sufficient security in all cases. In addition, construction thereof is troublesome in that the pivotable stop elements or levers must be provided on each rail end, which is associated with complex cabling and control and monitoring. In addition, it is also necessary to monitor how the moveable rails are positioned in relation to the stationary rails. It is also unclear what happens in the event of a problem with the stop elements and their springs (for example, fracture), since then the adoption of the position which stops the vehicles is not ensured. Furthermore, accessibility to these parts and maintenance thereof is troublesome and extremely difficult during operation of the system, especially as the travel paths are adapted to the size of the vehicle and are often spatially confined.

In-plant rail-bound transport system having shuttles which travel on rails, wherein the system comprises: stops and stop bars that interact with each other to secure against the shuttles overrunning of open rail ends or boundaries of travel paths, wherein the stop bars engage the stops to prevent overrunning of the open rail ends or boundaries of travel paths; wherein the stops have first and second immoveable stop elements and wherein the stop bars are able to move between a first overrunning position and a second overrunning position, wherein the first stop elements can be overrun in the first overrunning position of the stop bars, the second stop elements can be overrun in the second overrunning position of the stop bars; and wherein the first stop elements cannot be overrun in the second overrunning position of the stop bars and that the second stop elements cannot be overrun in the first overrunning position of the stop bars.

Owing to the fact that the stops have first and second immoveable stop elements and that the stop bars are able to move between a first overrunning position and a second overrunning position, wherein the first stop elements can be run over in the first overrunning position of the stop bars, the second stop elements can be run over in the second overrunning position of the stop bars and that the first stop elements cannot be run over in the second overrunning position of the stop bars and that the second stop elements cannot be run over in the first overrunning position of the stop bars, it is possible to provide a particularly secure system which prevents overrunning even if a component fails.

In accordance with an embodiment of the invention, overrunning of the rail ends is possible only if the stop bars are moved twice, wherein in the first position only the first stop element can be overrun but the stop bar strikes or bounces against the second stop element. Only by the second movement, i.e., backwards movement of the stop bar, can the second stop element then also be overrun. This redundancy therefore ensures that accidental overrunning cannot take place.

The stop bars may be disposed on the vehicles and the stops on the rails. By using the immoveable stops on the rails, only monitoring of the vehicles needs to be carried out. The stops are purely passive and thus do not need to be monitored. Owing to the generally high number of required overrun barriers, the fixed stops are extremely inexpensive compared with known solutions. The monitoring of the stop bars on the vehicles can be carried out by on-board electronics that is already provided.

In addition, the stop bars may be formed in such a way that the second overrunning position, i.e., to some degree the first bounce position, is automatically adopted by itself, for example, by spring action, if the system fails.

In one embodiment, the first and second stop elements are spaced apart from each other in the longitudinal direction of the rail line, i.e., in the travel direction of the vehicles on the rail. It is then constructionally particularly simple to move the stop bars between the first and second overrunning position, for example, by pivoting by 90°.

The stop bars may be formed as driven stops which can move between the first overrunning position and a second overrunning position, and then possibly also the driven stops can also move about a pivot axis oriented in the travel direction. In so doing, the driven stops can be formed to be able to move or pivot between the first overrunning position and a second overrunning position by at least 20° and at most 90° about a pivot axis oriented in the travel direction. In order to protect the vehicles in the event of the stop bars impacting against the stops, the stop bars may be formed as spring-loaded stops or shock absorbers which are mounted on both sides in the travel direction of the vehicles. The impact is, therefore, absorbed and the vehicle remains undamaged.

It is also feasible to use the interaction between the stop bars and stops for controlled braking of the vehicles, i.e., combating the kinetic energy during impact not only by shock absorbance but by friction. For this purpose, the stop bars can be provided with a brake lining which interacts with an inclined braking surface on one of the stop elements to brake the vehicle in the corresponding non-overrunning position. In other words, a surface provided with a brake lining is provided on the driven stop of the stop bar and rubs against an inclined braking surface during impact on the stationary stop on the rail or its stop element, wherein the friction continually increases owing to the inclined course of the braking surface. The inclined braking surface may be disposed on the first stop element and extend approximately vertically and form a laterally increasing inclined plane in the direction of travel towards the rail end.

A variation of the transport system includes a design in which the rails are formed as essentially C-shaped profiled rails, wherein the opening of the "C" is disposed inwards and downwards in such a way that the stop bars disposed on the vehicles can protrude into the essentially C-shaped profile and interact with stop elements disposed inside the "C". The stop elements can, therefore, be "hidden in the rail" and the vehicle can travel on the upper side of the rail.

The described transport system is suitable, for example, for use in storage and transport systems with single-level rack serving machines or so-called shuttles or with satellite vehicles. For example, so-called MultiShuttles® are used as single-level rack serving machines. These are described, for example, in EP 1 254 852 A1.

The system concept may be based on autonomous, rail-guided vehicles for transporting stored goods or containers, which travel inside and outside the storage system. The system has travel rails which are installed in the preliminary zone, standing or suspended in a level or in a plurality of levels in each level of the warehouse along the storage sections. In the case of the MultiShuttles, the vehicles may change levels via highly dynamic lifts. A corresponding arrangement also applies for possible variations of other vehicles.

In a further variation, the shuttle or satellite vehicle travels from a transfer machine, such as, for example, a rack serving machine, into the different sections of a storage system. The transfer within the storage aisle itself is then effected via a transfer machine which travels to the respective storage section. The shuttle itself then travels into the storage section where it sets down the load or picks it up and then travels to the transfer machine. The stops are also provided at the end of the travel path in this case in order to limit the travel path and prevent a crash.

In many cases, the performance of the whole system can be scaled as required by the addition of further vehicles, which makes this solution extremely economical. The stops or stop bars in accordance with embodiments of the invention can be provided on the travel paths wherever the rail lines require corresponding overrunning barriers for safety reasons or for technical reasons or even to regulate and control the process.

BRIEF DESCRIPTION OF THE DRAWINGS

Further details, features and advantages of the invention will become clear from the following description of exemplified embodiments with the aid of the drawing in which:

FIG. 1 is an end elevation view of a vehicle at a rail end piece;

FIG. 2 is a side elevation view of the stop bar of the vehicle of FIG. 1;

FIG. 3 is a top plan view of the stop bar of the vehicle of FIG. 1; and

FIG. 4 is the same view as FIG. 1, of an alternative embodiment.

DESCRIPTION OF THE PREFERRED EMBODIMENT

FIGS. 1 to 3 show a shuttle or the satellite, designated as a whole by 1, of a storage and transport system which conveys goods and/or containers of varying sizes along the travel path. For this purpose, it includes a load-picking-up means, not shown, which picks up or sets down the goods and/or containers. The loading space of the shuttle 1 is between a front and rear region, the mutual spacing of which can be adjusted according to the goods being transported. In the front region or rear region, the housing 2 is formed in a box-like manner in each case and accommodates the on-board electronics, super-capacitors for short-term power supply and to cover power peaks, radio equipment, etc.

The actual power supply and charging of the super-capacitors is effected via current collectors which "tap" a contact line. The contact line is conventionally formed either as a separate line or by the travel rail 3. The travel rail 3 is formed by two parallel rails laterally defining the travel path. The figures each show only one side thereof since the sides are formed in a corresponding manner. The shuttle runs on the travel rail 3 with four wheels 4, two wheels per side. The actual running surface 5 for the wheels 4 is formed by the upper side of the rail 3. The rails 3 are formed as essentially C-shaped profiled rails, wherein the opening 6 in the "C" is disposed inwards and downwards in such a way that the stop bars 7 disposed on both sides of the shuttle 1 can protrude into the essentially C-shaped profile and interact with stop elements 9 of the stops 8 disposed inside the "C".

The stops 8 are screwed onto the rail 3 in a fixed position and are formed by a first stop element 9a and a second stop element 9b which are spaced apart from each other in the travel direction, i.e., in the longitudinal direction of the rail line and form mutually offset stop surfaces 10a, b for the stop bars 7. The first stop element 9a is located in the longitudinal direction and travel direction of the shuttle 1 upstream of the second stop element 9b. The first stop element 9a is disposed in the upper region of the inner chamber of the rail 3 and extends completely between the side walls of the rail 3. The second stop element 9b is screwed as a block to the inside of the external side wall of the rail 3 in the lower region and protrudes by approximately one third of the width of the inner space of the rail 3 into this inner space. The stop bars 7 are formed as driven stops which each have a driven stop 11 which can be formed, for example, by a plate and is moveable between the first overrunning position and a second overrunning position about a pivot axis 12 oriented in the travel direction.

The driven stop 11 is able to move by 90° about the pivot axis 12, oriented in the travel direction, between the first overrunning position and a second overrunning position. In the first overrunning position, the stop 11 is approximately horizontal and in the second overrunning position it is approximately vertical. It is dimensioned such that in the first overrunning position it can run over the first stop element 9a and contacts the second stop element 9b (or the stop surface 10b thereof) and in the second overrunning position it can run over the second stop element 9b and contacts the first stop element 9a (or the stop surface 10a thereof) when the shuttle 1 travels along the rail 3 and "meets" the stops 8.

In order to effect the pivot movement (indicated by the arrow S in FIG. 1) of the respective stop 11, an electric motor 13 is provided which is switched off upon reaching the respective overrunning position by actuation of an appropriately placed switch 14. In a further application, in particular when the vehicle leaves the travel region only in exceptional cases such as repair, the pivot movement can also be effected by a manual actuating element. The stop 11 of the stop bar 7 is spring-mounted on both sides in the travel direction of the vehicles by means of a spring 15*a, b*. The stop 11 and its mechanism are disposed for this purpose on a platform 16 forming a type of carriage, which platform is disposed so as to be longitudinally displaceable inside a profile 17 which has an approximately square cross-section. The displacement along the profile 17 is damped by the spring 15 disposed inside the profile. This type of construction also has the advantage that the stop bars 7 can, therefore, be attached to the shuttles on both sides as an assembly, for which purpose the stop bar has in each case corresponding studs 18 at the ends of the profile 17.

During operation, function is as follows: The shuttle 1 moves in the travel direction along the rail 3, i.e., in the direction looking towards FIG. 1, and for these reasons should also always run over the stop 8 in a controlled manner. For this purpose, when the first stop element 9*a* is reached, the stop 11 is pivoted downwards by 90° from the vertical position into the horizontal which means that the first stop element 9*a* can be passed. The stop 11 is then pivoted back up by 90° into the vertical position upon reaching the second stop element 9*a* after overcoming the distance between the two stop elements, which means that the second stop element 9*b* can be passed. This process is controlled and requires two specific movements of the stop bars 7 in order to allow the shuttle 1 to pass. If a problem occurred, these two coordinated movements of the stop 11 to overcome the respective stop elements 9*a, b* would not take place, which means that the shuttle 1 would become "stuck" at the stop 8.

FIG. 4 shows an alternative embodiment of the stop bars and stops, wherein the structure of the shuttles 1 and rails 3 correspond to the embodiment above. In order to avoid repetition, only the differences will be discussed. The first stop element 9*a'* is now formed analogously to the first stop element 9*a* but attached only to the inside of the inner side wall of the rail 3 in the upper region and protrudes approximately by one third of the width of the inner space of the rail 3 into this inner space. In contrast to the embodiment above (or the second stop element 9*b'*), the first stop element 9*a'* also has an inclined braking surface 19'. The braking surface 19' extends approximately vertically and is formed by an inclined plane which increases laterally in the direction of travel towards the rail end. The stop bar is formed as a lever 11' which can move about a pivot axis 12' and is formed and dimensioned to contact the second stop element 9*b'* with its tip 20'. In order to cooperate with the braking surface 19', the lever 11' has a brake lining 21' which is disposed in a U-shaped recess 23' in the lever 11', and with which the lever 11' engages around the attachment wall 22' of the first stop element 9*a'* of the rail 3'. For this purpose, the brake lining 21' is disposed on an approximately vertically extending limb of the U of the recess 23'—as seen in the second overrunning position—so that it interacts with the inclined braking surface 19' to brake the shuttle in the corresponding non-overrunning position or second overrunning position, wherein the friction increases as the "travel length" increases by reason of the inclination. A pivot movement S' by about 20° is sufficient to pivot between the two positions of the lever 11'.

Therefore, this braking function thus achieved damps the shuttle 1 in a controlled manner and it is optionally possible to dispense with the spring arrangement of the embodiment above.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The invention claimed is:

1. In-plant rail-bound transport system having shuttles which travel in a longitudinal direction on rails, wherein the system comprises:
   a stop and a stop bar that interact with each other to secure against one of the shuttles overrunning of an open end of one of the rails, wherein the stop bar engages the stop to prevent the one of the shuttles overrunning of the open end of the one of the rails;
   wherein the stop has first and second immoveable stop elements and wherein the stop bar is able to move between a first position and a second position, wherein the stop bar overruns the first stop element in the first position of the stop bar, and the stop bar overruns the second stop element in the second position of the stop bar; and
   wherein the stop bar is blocked by the first stop element in the second position of the stop bar to prevent the one of the shuttles overrunning of the open end of the one of the rails and the stop bar is blocked by the second stop element in the first position of the stop bar to prevent the one of the shuttles overrunning of the open end of the one of the rails.

2. Transport system as claimed in claim 1 wherein the stop bar is disposed on one of the shuttles and the stop is disposed on the one of the rails.

3. Transport system as claimed in claim 2 wherein the first and second stop elements are spaced apart from each other in the longitudinal direction.

4. Transport system as claimed in claim 3 wherein the stop bar comprises a driven stop which can be driven between the first position of the stop bar and the second position of the stop bar.

5. Transport system as claimed in claim 4 wherein the driven stop moves between the first position and the second position between 20° and 90° about a pivot axis.

6. Transport system as claimed in claim 4 wherein the driven stop moves about a pivot axis oriented in the longitudinal direction.

7. Transport system as claimed in claim 6 wherein the driven stop moves between the first position and the second position between 20° and 90° about a pivot axis.

8. Transport system as claimed in claim 2 wherein the stop bar comprises a driven stop which can be driven between the first position of the stop bar and the second position of the stop bar.

9. Transport system as claimed in claim 8 wherein the driven stop moves about a pivot axis oriented in the longitudinal direction.

10. Transport system as claimed in claim 9 wherein the driven stop moves between the first position and the second position between 20° and 90° about a pivot axis.

11. Transport system as claimed in claim 8 wherein the driven stop moves between the first position and the second position between 20° and 90° about a pivot axis.

12. Transport system as claimed in claim 2 wherein the at least one of the rails is formed with an essentially C-shaped cross section defining an opening in the at least one of the rails that is disposed inwards and downwards wherein the stop bar protrudes into the opening and interacts with stop elements disposed in the at least one of the rails.

13. Transport system as claimed in claim 1 wherein the first and second stop elements are spaced apart from each other in the longitudinal direction.

14. Transport system as claimed in claim 1 wherein the stop bar comprises a driven stop which can be driven between the first position of the stop bar and the second position of the stop bar.

15. Transport system as claimed in claim 14 wherein the driven stop moves about a pivot axis oriented in the longitudinal direction.

16. Transport system as claimed in claim 15 wherein the driven stop moves between the first position and the second position between 20° and 90° about a pivot axis.

17. Transport system as claimed in claim 14 wherein the driven stop moves between the first position and the second position between 20° and 90° about a pivot axis.

18. Transport system as claimed in claim 1 wherein the stop bar is spring mounted in opposite directions of the longitudinal direction.

19. Transport system as claimed in claim 1 wherein the stop bar includes a brake lining which interacts with an inclined braking surface on one of the stop elements to brake the one of the shuttles.

20. Transport system as claimed in claim 19 wherein the inclined braking surface is formed by an inclined plane which increases in width laterally in the longitudinal direction of the rail path.

21. Transport system as claimed in claim 20 wherein the at least one of the rails is formed with an essentially C-shaped cross section defining an opening in the at least one of the rails that is disposed inwards and downwards wherein the stop bar protrudes into the opening and interacts with stop elements disposed in the at least one of the rails.

* * * * *